United States Patent [19]
Handa et al.

[11] Patent Number: 5,303,338
[45] Date of Patent: Apr. 12, 1994

[54] COMPACT ELECTRONIC APPARATUS EQUIPPED WITH GRAPHIC REPRESENTING FUNCTION

[75] Inventors: Akihiro Handa, Fussa; Osamu Negishi, Akishima, both of Japan

[73] Assignee: Casio Computer Co., Ltd., Tokyo, Japan

[21] Appl. No.: 777,675

[22] Filed: Oct. 15, 1991

[30] Foreign Application Priority Data

Oct. 18, 1990 [JP] Japan .................................. 2-279924
Dec. 20, 1990 [JP] Japan .................................. 2-404209
Dec. 26, 1990 [JP] Japan .................................. 2-406446

[51] Int. Cl.$^5$ .............................................. G09F 1/14
[52] U.S. Cl. ...................................................... 395/140
[58] Field of Search ................... 340/747, 748, 722; 364/139, 141, 142, 408, 710.11; 395/140, 142; 324/121 R

[56] References Cited
U.S. PATENT DOCUMENTS

4,535,416 8/1985 Kano et al. .
4,747,074 5/1988 Yoshida ............................... 340/747
4,794,553 12/1988 Watanabe et al. .
4,794,554 12/1988 Tamiya .
4,908,786 3/1990 Kuno et al. .......................... 395/140
4,992,962 2/1991 Ishida et al. .......................... 340/747
5,058,009 10/1991 Yoshino et al. ...................... 364/408

Primary Examiner—Ulysses Weldon
Assistant Examiner—Matthew Luv
Attorney, Agent, or Firm—Frishauf, Holtz, Goodman & Woodward

[57] ABSTRACT

In a compact electronic apparatus, a keyboard and a display unit are provided, and also either a function formula or an inequality inputted from the keyboard is displayed in a graphic representation on the display unit. The compact electronic apparatus further comprises a trace function for sequentially pointing a point on one of the displayed graphic representations and simultaneously for displaying coordinate data, and a control unit for moving one graphic representation to a trace of another graphic representation when a plurality of graphic representations are being displayed, and also for changing a movement amount of the trace.

7 Claims, 3 Drawing Sheets

COMPACT ELECTRONIC APPARATUS EQUIPPED WITH GRAPHIC REPRESENTING FUNCTION

BACKGROUND OF THE INVENTION

1. Field of the Invention

The present invention generally relates to a compact electronic apparatus having a function for displaying a given formula in a graphic representing mode. More specifically, the present invention is directed to a function for tracing a point on the displayed graphic representation.

2. Description of the Related Art

Conventionally, compact electronic calculators equipped with a graphic display function have been commercially available, by which inputted function formulae are displayed in a graphic representation on a dot matrix type liquid crystal panel. Such a sort of compact electronic calculators are equipped with a trace function that a pointer is displayed in a flicker mode on the displayed graphic representation and the coordinate data representative of the pointer is displayed. In this case, for instance, the pointer may be moved by 1 dot along the X direction every time the trace pointer moving key is operated.

Also in the conventional calculators, when a plurality of function formulae are inputted, these function formulae are successively displayed one by one in the graphic representation on the display unit every time the excution key ("EXE" key) mounted on the key input unit is depressed. In this case, the graphic representations which have been displayed up to the previous key operation are not erased, but are displayed in conjunction with the present graphic representation. Such a representation form is so-called "overlaying graphic representation".

Function formulae to be graphically represented may be displayed not only by way of a form of $y=f(x)$, but also by way of an inequality such as $y>f(x)$.

However, in case that a trace operation is performed after displaying the graphic representation, although a plurality of graphs are displayed in the overlaying graphic representation mode on the display unit, the tracing operation cannot be excuted with respect to only the last one graphic representation.

Furthermore, when an inequality is traced, it is required to clarify whether coordinate data on a pointer flickered on a graphic representation is contained (namely $\geq$, $\leq$), or not (namely $>$, $<$).

In case that coordinate data on the graphic representations are sequentially obtained by operating the trace pointer moving key, since the display pixel is moved in unit of only 1 dot, it is very inconvenient for operators that a lenghty time is required so as to move the pointer to a desirable moving place.

As previously explained, although the conventional calculators with the graphic function are equipped with the above-described trace function, any operators can feel the actual use of such a function inconvenient.

SUMMARY OF THE INVENTION

An object of the present invention is to provide a compact electronic apparatus equipped with a graphic display function and having improved operabilities of the trace function.

An electronic apparatus, according to the present invention, comprises:

formula input means constructed of a keyboard having at least a number entry key and a function key;

formula storage means for storing therein a plurality of formulae which have been entered by the formula input means;

graphic representing means for sequentially graphic-representing the respective formulae stored in the formula storage means;

display means for displaying a graphic representation of each of the formulae formed by the graphic representing means on the same display screen;

trace means for sequentially designating a point on a single graphic representation among the plural graphic representations displayed on the display means, and also for visually outputting a coordinate value between the designated points; and, control means for varying an output mode of the trace means.

BRIEF DESCRIPTION OF THE DRAWINGS

The above object and other useful and novel features of the present invention will become more readily apparent in the following description of the acompanying drawings, in which.

DESCRIPTION OF THE PREFERRED EMBODIMENTS

Referring now to drawings, one preferred embodiment of a compact calculator to which the present invention has been applied will now be described.

ARRANGEMENT OF COMPACT CALCULATOR

Figure 1:
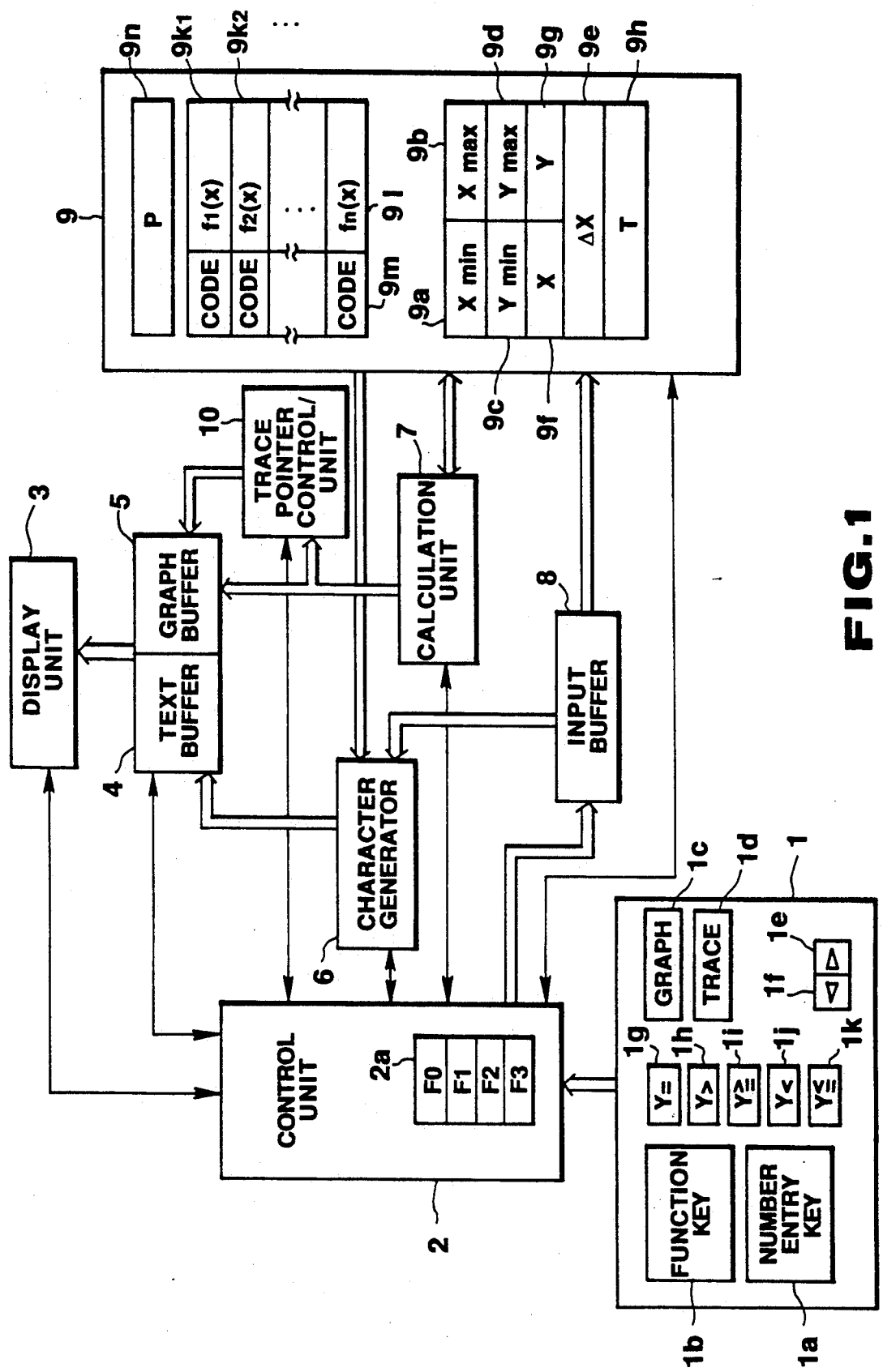
FIG. 1 is a schematic block diagram an entire arrangement of a compact calculator of a preferred embodiment, to which the present invention has been applied.

FIG. 1 represents a circuit arrangement of this compact calculator, and reference 1 indicates a key input unit. The following keys are provided in this key input unit 1; a number entry key $1a$ for entering numeral values and the like; a function key $1b$ for entering functions such as $\times$, $\div$ sinx and cosx; a graph key $1c$ for graphically displaying an entered formula; a trace key $1d$ for a trace mode; a right movement key $(>)1e$ for moving a trace pointer to a right direction; and a left movement key $(<)1f$ for moving a trace pointer to a left direction.

Further, the key input unit 1 is equipped with an "Y=" key $1g$ for designating a function formula when a formula is inputted; and also an "Y>" key $1h$, an "Y$\geq$" key $1i$ and an "Y<" key $1j$ and an "Y$\leq$" key $1k$ for designating inequality.

A control unit 2 contains ROM (read-only memory) into which a control program has been stored, and controls operations of various units in response to key input signals derived from the key input unit 1 . The control unit 2 further includes a flag memory 2a for storing flags F0 to F4.

To this control unit 2, a display unit 3, a text buffer 4, a graph buffer 5, a character generator 6, a calculation unit 7, an input buffer 8, a memory 9 and a trace pointer control unit 10 are connected.

The display unit 3 is such a dot matrix type liquid crystal display panel arranged by, for instance, 64 dots (vertical direction) and 96 dots (horizontal direction). The display unit 3 displays charcters and graphic representations based on the display data outputted from the text buffer 4 and graph buffer 5.

The text buffer 4 corresponds to a display buffer for storing character data, whereas the graph buffer 5 corresponds to a display buffer for storing data on graphic representation. Then, both the text buffer 4 and the graph buffer 5 each owns a memory capacity equal to at least a single screen of the display unit 3, and each outputs the display data stored in the respective buffers 4 and 5 to the display unit 3 based on the instruction of the control unit 2.

The character generator 6 produces a display pattern from the character code and symbol which are read out from the input buffer 8 and memory 9, and outputs the display pattern to the text buffer 4.

The calculation unit 7 executes a calculation process of data stored in the memory 9 in response to a calculation instruction of the control unit 2, and outputs the calculation result to the memory 9 and graph buffer 5.

The input buffer 8 temporarily stores the key input data inputted from the key input unit 4, and outputs the key.input data to the character genrator 6 and memory 9.

The memory 9 is arranged by, for example, a random access memory (RAM), and stores both the inputted numeral data and the various data such as the calculation data calculated by the calculation unit 7. As represented in FIG. 1, this memory 9 is equipped with an $X_{min}$ register 9a, an $X_{max}$ register 9b, a $Y_{min}$ register 9c, a $Y_{max}$ register 9d, a $\Delta X$ register 9e, an X register 9f, an Y register 9g, and also a trace pitch register 9h.

The $X_{min}$ register 9a is such a register for storing range data $X_{min}$ representative of a minimum range in an X-axis direction of the display unit 3. The $X_{max}$ register 9b is such a register for storing range data $X_{max}$ indicative of a maximum range in an X-axis direction. The $Y_{min}$ register 9c is such a register for storing range data $Y_{min}$ indicative of a minimum range along the Y-axis direction. The $Y_{max}$ register 9d stores range data $Y_{max}$ indicative of the maximum range in the Y-axis direction.

In the $\Delta X$ register 9e, a value of X corresponding to an 1-dot display pixel is stored, namely a value calculated by $(X_{max}-X_{min})\div$(dot number of horizontal direction $-1$) is stored. An X value in the trace mode is stored in the X register 9f. A Y value which has been calculated by substituting a formula indicative of f(X) with the X value, is stored in the Y register 9g. An amount of movement of the trace pointer in the X direction is stored in the trace pitch register 9h.

The memory 9 has formula storage registers 9kn ("n" being any integer) for storing a plurality of inputted formulae. The formula storage registers 9kn is subdivided into a first area 9l for storing a right-hand portion of a formula expressed by f(X), and a second area 9m for storing a code used to discriminate a function formula from an inequality formula.

A p-register 9n stores a pointer for designating one of these formula storage registers 9kn and for designating one formula.

The trace pointer control unit 10 performs a process to write display data into the graph buffer 5, by which the trace pointer is flickered on the display unit 3, based on a coordinate value calculated in the calculation unit 7 while executing the trace operation.

OPERATIONS OF COMPACT CALCULATOR

Referring now to a flow chart shown in FIG. 2, various operations of the compact calculator with the above-described preferred embodiment of the present invention will be described. With employment of the number entry key 1a, function key 1b, and function-formula designating key 1g and the like mounted on the key input unit 1, formulae are entered.

Figure 3A:
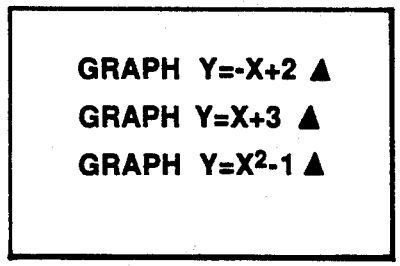
FIG. 3A represents one example of a display screen where formulae are represented as graphic representations.

As shown in FIG. 3A, it is assumed in this preferred embodiment that the following three formulae are entered:

$$Y=-X+2 \qquad (1)$$

$$Y=X+3 \qquad (2)$$

$$Y=X^2-1 \qquad (3)$$

The entered function formulae are stored via the control unit 2 and input buffer 8 to the formula storage register 9 of the memory 9. Assuming now that before the function formulae are inputted, both a maximum value and a minimum value corresponding to the display range in the graph along the X-axis direction, for example, "$-5$" and "5", have been inputted into the $X_{min}$ register 9a and $X_{max}$ register 9b so as to set the X-axis range, whereas both a maximum value and a minimum value corresponding to a display range in the graph along the Y-axis direction, for instance, "$-3$" and "8", has been inputted into the $Y_{min}$ register: 9c and $Y_{max}$ register 9d so as to set the Y-axis range.

When the graph key 1c is operated after entering the formulae, the process is advanced from a step S1 to a step S2 at which a graphic display process is excuted. In this graphic display process, the X values which are increased from $X_{min}$ to $X_{max}$ by $\Delta X$ are substituted into the respective formulae stored in the formula storage register 9k, thereby obtaining the Y value, and also the coordinate points (X, Y) are plotted.

Figure 3D:
FIGS. 3B to 3E indicate examples of display screens where various graphic representations corresponding to various key operations are displayed; and, FIG. 3F shows one example of a graphic representation for an inequality.
Figure 3D:
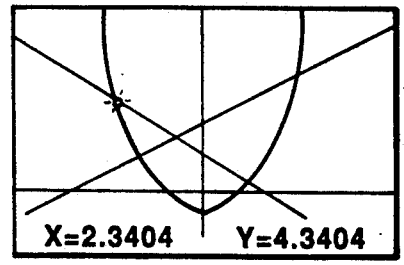
Figure 3B:
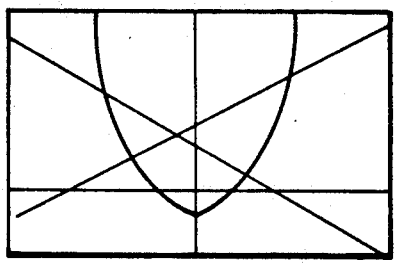

As a result, graphic representation as shown in FIG. 3B is made in the display unit 3. After the graphic representation, "0" is set into the P register of the memory 9 at a step S3.

Next, if the trace key 1d is operated, the process is advanced from a step S4 to a step S5. At the step S5, "1" is written into the flag memory F0 so as to set the trace mode. Then, at a step S6, "0" is written into each of flag memories F1 and F2 in order to initialize the enter system.

Thereafter, at a step S7, the value "P" of the P register 9n is incremented by 1 and the process is advanced to a further step. At the step S8, a judgement is made whether or not $P \leq n$ ("n" being a quantity of inputted function formulae). Since $P=1$ and $n=3$, the judgement result becomes "YES" so that the process is advanced to a step S9. At this step S9, the control unit 2 discriminates the codes which have been stored in the second area 9m of formula (1) stored in the formula register 9kl in accordance with the content of the P register 9n.

Figure 3E:
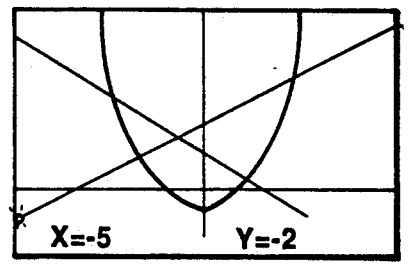
Figure 3C:
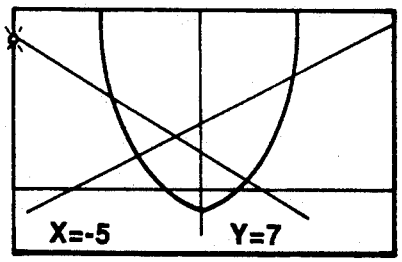

Since the formula (1) corresponds to the formula inputted by operating the "Y=" key 1g, and the code corresponding to "Y=" has been stored in the second area 9m, this judgement result has been stored in the flag memory F3 of the control unit 2. At the subsequent step S10, the value of $X_{min}$ is inputted into the X register 9f. At a step S11, the calculation unit 13 calculate the value of X coordinate at the left end portion of the graphic representation by employ this formula in order to display the trace pointer that is flicked at the left end portion of the display 1 unit 1 5. The value "−5" which has been set in the $X_{min}$ register 9a is substituted in the formula (1) as the X-coordinate value:

$$Y = -X + 2,$$

and also the Y-coordinate value of "7" which has been obtained by the calculation, is held in the Y register 9g. Thus, the X and Y coordiante values are supplied to the pointer control unit 11 so as to pointer out one point of the graph buffer 5. As a result, this point is displayed in a flicker mode (step S12). At the same time, both the X and Y coordiante values are transferred via the character generator 6 to the text display buffer 10. Also, the characters of "X=" and "Y=" are sent thereto based on the content of the flag F3, and then, as shown in FIG. 3(C), "X=−5, Y=7" are displayed on the lower portion of the display unit 15 (step S13).

Thereafter, to trace the graphic representation of the formula (1), when the "▷" key 1e is manipulated, the process is advanced from a step S19 to a step S20. At this step S20 a check is made whether or not it is under the trace mode. If 1 the check result is "YES" at this step S20, the process is advanced to a next step S21. To the contrary, if the check result becomes "NO", then the process is advanced to another process (not shown in FIG. 2). Now, since the operation is under the trace mode (namely, YES), the process is advanced to a further step S21. At the step S21, another check is established whether or not the content of the flag memory F2 is equal to "1". The function of the flag memory F2 is to store such a fact that the "▷" key 1e has been operated. Assuming now that "F2=0", the judgement result becomes "NO" and the process is advanced to a step S22.

At the step S22, a check is made whether or not the content of the flag memory F1 is equal to "1". The function of the flag memroy F1 is to store such a fact that the trace pitch has been set. In this case, since the trace pitch has not yet been set (F1=0), the process is advanced to a step S23 at which the value stored in the ΔX register 9e is written into the T register 9h. Then, "1" is set into the flag memory F2 at the step S24, whereby it is memorized that the trace pitch setting operation has been accomplished.

At a step S25, the content of the X register 9f is added to the content of the T register 9h, and also the process operations as defined after the step S11 are performed, so that a point present on the next graphic representation, which is advanced by 1 dot in the X direction, is traced.

Thus, upon depression of the "▷" key 1e, the trace pointer is moved every 1 dot along the right direction (see FIG. 3D).

Under such conditions, when the "trace" key 1d is operated, the process is advanced from the step S4 to the process operation as defiend after the step S5. Then, since the content of 1 the P register 9n is incremented by 1 at the step S7, a designation is made of the subsequent formula stored in the formula storage register 9k and thus, as shown in FIG. 3E, the tracē pointer is displayed on the left end of the graphic representation for the subsequent formula.

When the content of the P register 9n exceeds the number of formulae which has been stored, the judgement result become "NO" at the step S8, so that the process is advanced to the step S14 at which the content of the P register 9n is set to "1". Thereafter, it returns to the designation of the formulae (1).

Now, a description will be made of such a case that the trace pitch is arbitrarily set. In the trace mode, when the number entry key is operated, the process is advanced from the step 15 to the step S16. At this step S16, it is judged whether or not the trace mode is designated. If YES at the step S16, then the inputted numeral value is fetched at the T register 9h at the step S17. Then, "1" is set to the flag F1 in the step S18.

Thereafter when the "▷" key 1e is operated, the process operation is advanced from the step S19 to the steps S20, S21 and S22. At the step S22, the judgement result becomes "YES" and the process operation is advanced to the steps S24 and S25.

As a consequence, since the numeral value (T) set in the T register 9h is added to X at the step S25, the coordinate values (X, Y) which will then be calculated, correspond to a point which is advanced from the first trace point by the numeral value "T" along the X direction. Since this value "T" is held in the T-register 9h, the trace pointer is moved by the set value every time the "▷" key 1e is operated.

Then, trace operation when an inequality is displayed will now be explained. In this case, inequalities of "Y>X²" and also "Y≦X+1" are inputted by operating the key input unit 1, whereby graphic representation corresponding thereto are displayed on the display 3.

First, when the "Y>" key 1h is operated, the control unit 2 designates one of the formula storage registers 9kn of the memory 9. Then, the storage registers 9kn are successively designated. The inequality symbol code "Y>" is stored in the second area 9, of the formula storage register 9kl.

Subsequently, when the function "X²" is inputted by operating the function key 1b, the inputted function "X²" is stored in the first area 9l of the formula storage register $9k_1$.

Similarly, the other inequality of "Y≦X+1" is stored in the formula storage register $9k_2$ of the memory 9.

Then, when the "graph" key 1c is operated, the graphic process is performed in the similar manner to the above-described graphic process. That is, a check is made at the step S1 whether or not the "graph" key 1c is operated. In this case, the judgement result becomes "YES" and the process is advanced to the step S2.

At the step S2, the graphic representation of Y=X² is plotted. Thereafter, all display elements in the upper portion of this graphic representation are turned on. Next, another graphic 1 representation of Y=X1 is plotted, and then the lower portion of this graphic representation is displayed by lighting under AND-gating condition with the above-described lighting area. As a result, the graphic representation shown in FIG. 3A is excuted.

Figure 2:
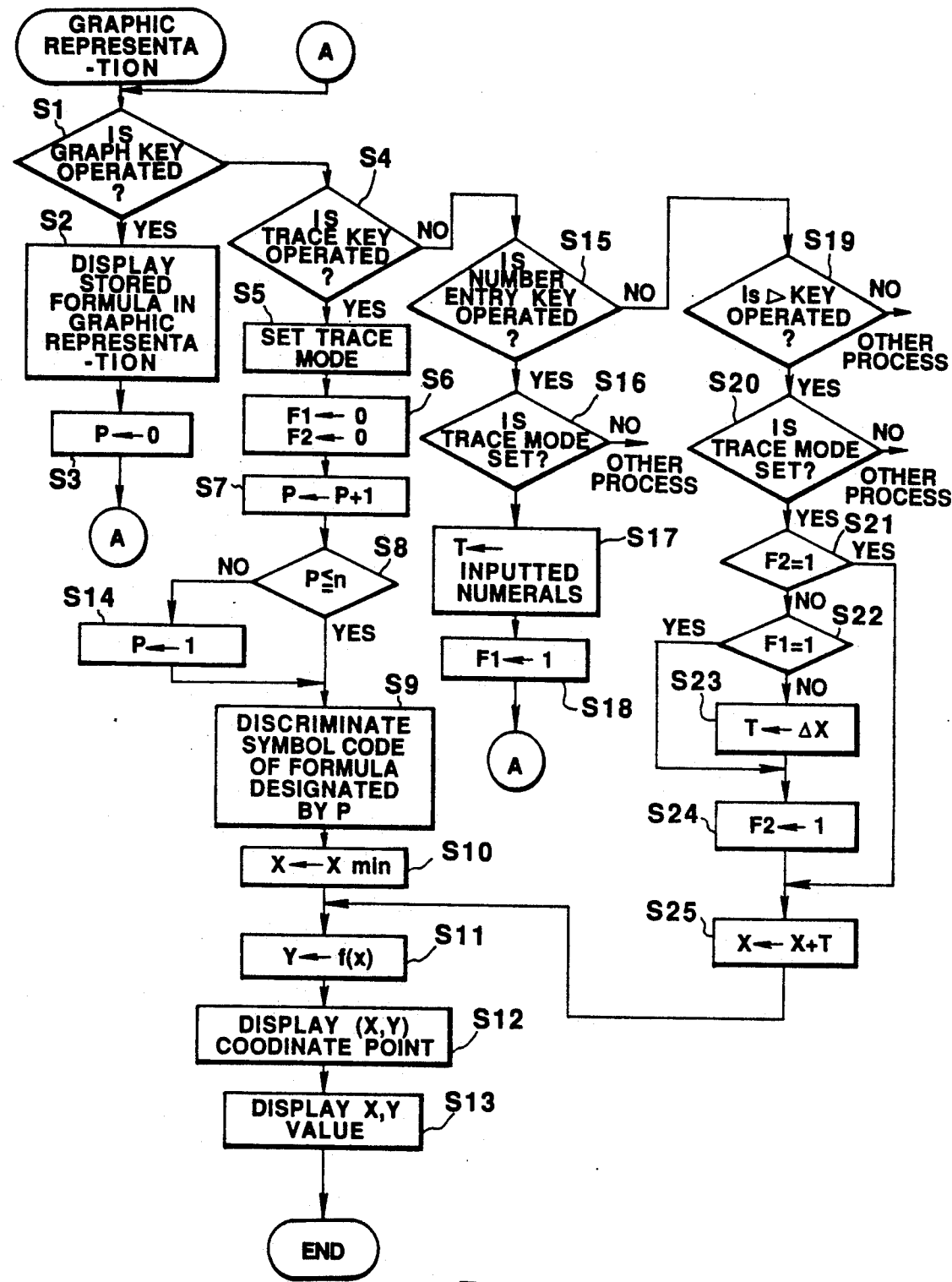
FIG. 2 is a flow chart for representing an operation of the compact calculator shown in FIG. 1.

Now, if the "trace" key 1d is operated so as to trace the boundary of the inequality, the judgement result becomes "NO" at the step S1 shown in FIG. 2 and the process is advanced to the step S4. At this step S4, a check is made whether or not the inputted key corresponds to the "trace" key 1d. If YES, then the process operations as defined after the step S5 will be At the step S7, the inequality of "$Y>X^2$", in which the trace process is performed, is selected. At the step S9, the code which has been stored in the selected second area 9m of the formula storage register 9k and the judged code is stored in the flag F3. Based upon this flag, an inequality symbol pattern to be displayed is determined. In this case, since the inequality symbol code "$Y>$" is stored, it is so determined that the inequality symbol pattern "$Y>$" is outputted from the character generator 6.

Thereafter, the minimum X-range data $X_{min}$ which has been stored in the $X_{min}$ register 9a of the memory 9 is written into the X register 9f at the step S10. At the step S11, the Y value is calculated by substituting the X value stored in the X register 9f by "$X^2$" in the first area 9l of the formula storage register $9k_1$, and the calculated Y value is stored in the Y register 9g.

At the step S12, the coordinate (X, Y) is displayed in the flicker made. In other words, based upon the X value of the X register 9f and the Y value of the Y register 9g, the pointer is displayed in the dot flicker mode on the graphic representation of the displayed inequality of "$Y>X^2$".

Figure 3F:
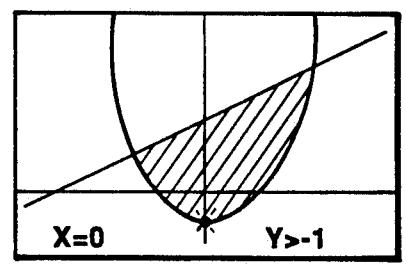

At the step S13, both the X value of the X register 9f of the memory 9 and the Y value of the Y register 9g are converted into the display patterns by the character generator unit 6, and the resultant pattern are stored in the text buffer 4. The character generator unit 6 sends out the inequality symbol pattern "$Y>$" and the pattern "$X=$" to the text buffer 4 based on the flag F3. As a consequence, the X, Y value and the inequality symbol indicating whether or not the Y value is included into the inequality are displayed on the lower position of the display unit. FIG. 3F represents one example of such displays.

What is claimed is:

1. An electronic apparatus comprising:
    formula input means, comprising a keyboard having at least number keys and function keys, for entering a formula;
    formula storage means for storing at least a formula entered through the formula input means;
    display means, having an X-Y matrix type display screen, for displaying various data on the display screen;
    graphic representing means for displaying at least a graph of the formula stored in the formula storage means on the display screen of the display means;
    data entering means for entering an arbitrary selected value dX to set a trace pitch in an X-direction;
    first storage means for storing the value dX entered through the data entering means;
    second storage means for storing a value Xo relating an arbitrary point to be displayed on the display screen of the display means;
    advancing means for changing a position of the point displayed on the display screen of the display means;
    tracing means for repeatedly changing the position of the displayed point by the trace pitch for said selected value dX by, upon each operation of the advancing means, reading out the value dX from the first storage means and the value Xo from the second storage means, adding the value dX to the value Xo to obtain a sum value X1, calculating a value Y1 corresponding to the sum value X1 from the formula stored in the formula storage means, and for storing the sum value X1 in the second storage means in place of the value previously stored therein;
    coordinate displaying means for displaying on the display screen of the display means (a) the values X1 and Y1 obtained by the tracing means, and (b) each point designated by the values X1 and Y1 due to operation of said advancing means.

2. An electronic apparatus as claimed in claim 1, further comprising means for displaying an inequality relationship of a coordinate value of a designated point when an inputted formula is an inequality.

3. An electronic apparatus as claimed in claim 2, wherein:
    said formula input means includes a designation key for designating a type of inequality;
    said formula storage means includes means for storing a content of said designation key in accordance with the formula; and
    said inequality relationship display means includes means for determining a display pattern in accordance with the content of the stored content of said designation key.

4. An electronic apparatus as claimed in claim 2, wherein said inequality relationship display means includes means for displaying an inequality symbol with the value Y1 of the designated point.

5. An electronic apparatus as claimed in claim 1, further comprising graph changing means for changing a graph to be traced by said trace means into another graph under a condition of displaying a plurality of graphs on a same display screen.

6. An electronic apparatus as claimed in claim 5, wherein:
    said tracing means includes designating means for designating one formula stored in said formula storage means; and
    said graph changing means includes means for changing said formula designation by said designating means into another formula designation.

7. An electronic apparatus as claimed in claim 1, wherein said advancing means includes a specific key for entering a command to change a position of the point displayed on the display screen.

* * * * *